(12) United States Patent
Seo et al.

(10) Patent No.: US 9,853,786 B2
(45) Date of Patent: Dec. 26, 2017

(54) METHOD AND DEVICE FOR REPORTING CHANNEL STATE INFORMATION IN WIRELESS COMMUNICATION SYSTEM

(71) Applicant: LG ELECTRONICS INC., Seoul (KR)

(72) Inventors: Inkwon Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 14/772,690

(22) PCT Filed: Mar. 13, 2014

(86) PCT No.: PCT/KR2014/002105
§ 371 (c)(1),
(2) Date: Sep. 3, 2015

(87) PCT Pub. No.: WO2014/142571
PCT Pub. Date: Sep. 18, 2014

(65) Prior Publication Data
US 2016/0013905 A1    Jan. 14, 2016

Related U.S. Application Data

(60) Provisional application No. 61/780,863, filed on Mar. 13, 2013, provisional application No. 61/805,132, filed on Mar. 25, 2013.

(51) Int. Cl.
| | |
|---|---|
| H04L 12/26 | (2006.01) |
| H04L 5/00 | (2006.01) |
| H04B 17/345 | (2015.01) |
| H04B 7/06 | (2006.01) |
| H04L 1/00 | (2006.01) |
| H04W 24/10 | (2009.01) |

(Continued)

(52) U.S. Cl.
CPC ......... *H04L 5/0048* (2013.01); *H04B 7/0456* (2013.01); *H04B 7/0626* (2013.01);
(Continued)

(58) Field of Classification Search
None
See application file for complete search history.

(56) References Cited

U.S. PATENT DOCUMENTS

2012/0257515 A1*  10/2012  Hugl .................... H04W 24/10
                                                                370/252
2013/0039284 A1    2/2013  Marinier et al.
(Continued)

FOREIGN PATENT DOCUMENTS

| KR | 10-2013-0016701 | 2/2013 |
|---|---|---|
| WO | 2013/020268 | 2/2013 |

OTHER PUBLICATIONS

Alcatel-Lucent, et al., "PDSCH rate matching behaviour for ZP CSI-RS resources and IMRs," 3GPP TSG RAN WG1 Meeting #71, R1-124862, Nov. 2012, 7 pages.

(Continued)

*Primary Examiner* — Brandon Renner
(74) *Attorney, Agent, or Firm* — Lee, Hong, Degerman, Kang & Waimey

(57) ABSTRACT

One embodiment of the present invention relates to a method by which a terminal reports channel state information (CSI) in a wireless communication system, the channel state information reporting method comprising the steps of: deriving an interference measurement on the basis of a zero power CSI-reference signal (RS) related to a CSI-interference measurement (IM) resource configuration: calculating a channel quality information (CQI) value on the basis of the interference measurement; and transmitting CSI including the CQI value to a base station, wherein at least one RE according to the CSI-IM resource configuration is included in different ECCEs included in a PRB pair.

19 Claims, 10 Drawing Sheets (a)

(b)

(51) Int. Cl.
*H04B 7/0456* (2017.01)
*H04J 11/00* (2006.01)

(52) U.S. Cl.
CPC ......... *H04B 7/0639* (2013.01); *H04B 17/345* (2015.01); *H04L 1/0026* (2013.01); *H04L 5/0057* (2013.01); *H04L 5/0073* (2013.01); *H04W 24/10* (2013.01); *H04J 11/0023* (2013.01); *H04L 5/0016* (2013.01); *H04L 5/0023* (2013.01); *H04L 5/0094* (2013.01)

(56) References Cited

U.S. PATENT DOCUMENTS

2014/0233407 A1* 8/2014 Pourahmadi .......... H04L 5/0051 370/252
2015/0111505 A1* 4/2015 Kim ....................... H04L 5/005 455/67.13
2015/0256307 A1* 9/2015 Nagata .................. H04L 5/0051 370/328
2015/0318973 A1* 11/2015 Wang .................... H04W 24/10 370/329

OTHER PUBLICATIONS

Ericsson, et al., "Relation between ZP CSI-RS Resources and IMRs," 3GPP TSG RAN WG1 #71, R1-125197, Nov. 2012, 3 pages.

PCT International Application No. PCT/KR2014/002105, Written Opinion of the International Searching Authority dated Jun. 24, 2014, 14 pages.

\* cited by examiner

FIG. 5
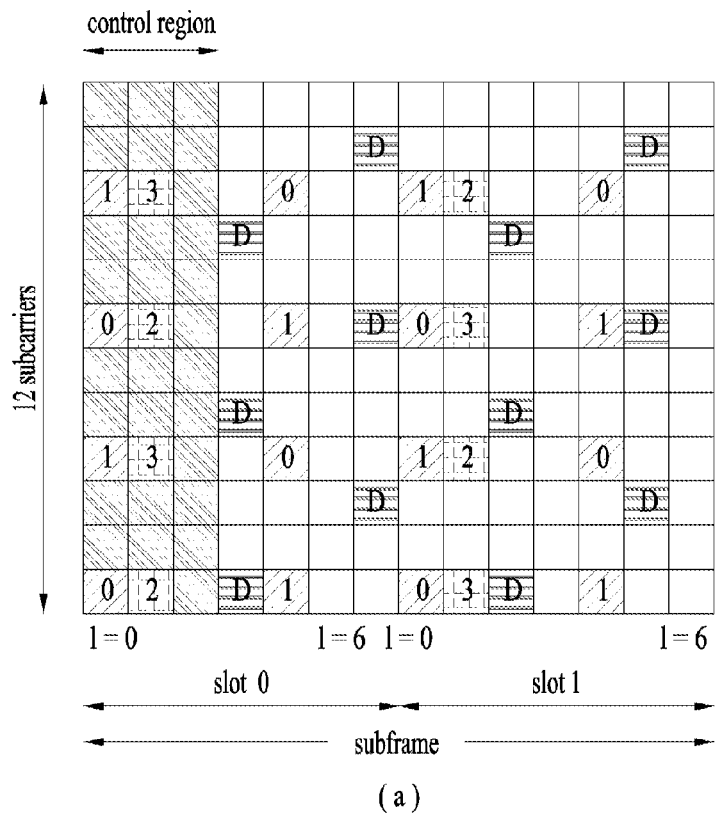
(a)
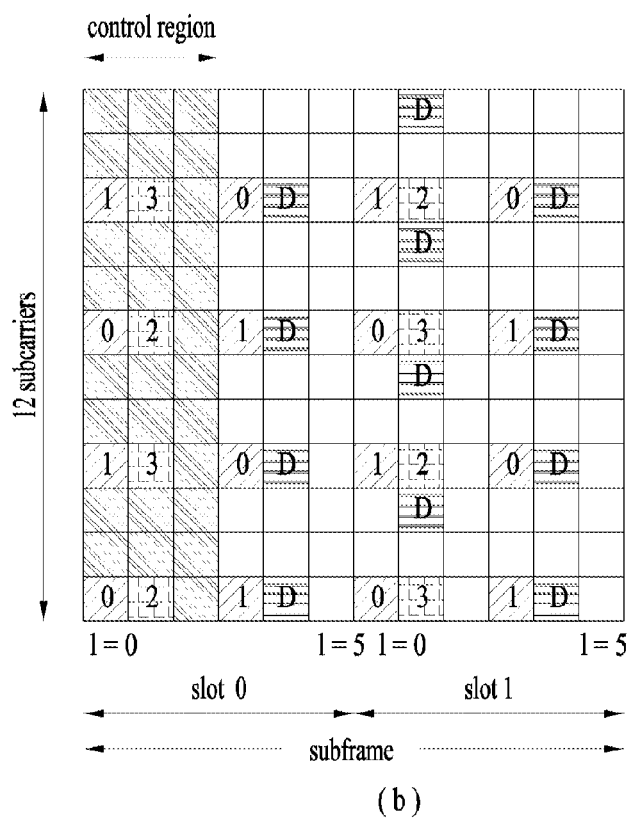
(b)

EREG index

PRB pair #0:
| 0 | 4 | 8 | 12 |
| 1 | 5 | 9 | 13 |
| 2 | 6 | 10 | 14 |
| 3 | 7 | 11 | 15 |

PRB pair #1:
| 0 | 4 | 8 | 12 |
| 1 | 5 | 9 | 13 |
| 2 | 6 | 10 | 14 |
| 3 | 7 | 11 | 15 |

PRB pair #2:
| 0 | 4 | 8 | 12 |
| 1 | 5 | 9 | 13 |
| 2 | 6 | 10 | 14 |
| 3 | 7 | 11 | 15 |

PRB pair #3:
| 0 | 4 | 8 | 12 |
| 1 | 5 | 9 | 13 |
| 2 | 6 | 10 | 14 |
| 3 | 7 | 11 | 15 |

Distributed PRB set

PRB pair #0:
| 0 | 4 | 8 | 12 |
| 3 | 7 | 11 | 15 |
| 2 | 6 | 10 | 14 |
| 1 | 5 | 9 | 13 |

PRB pair #1:
| 1 | 5 | 9 | 13 |
| 0 | 4 | 8 | 12 |
| 3 | 7 | 11 | 15 |
| 2 | 6 | 10 | 14 |

PRB pair #2:
| 2 | 6 | 10 | 14 |
| 1 | 5 | 9 | 13 |
| 0 | 4 | 8 | 12 |
| 3 | 7 | 11 | 15 |

PRB pair #3:
| 3 | 7 | 11 | 15 |
| 2 | 6 | 10 | 14 |
| 1 | 5 | 9 | 13 |
| 0 | 4 | 8 | 12 |

FIG. 9
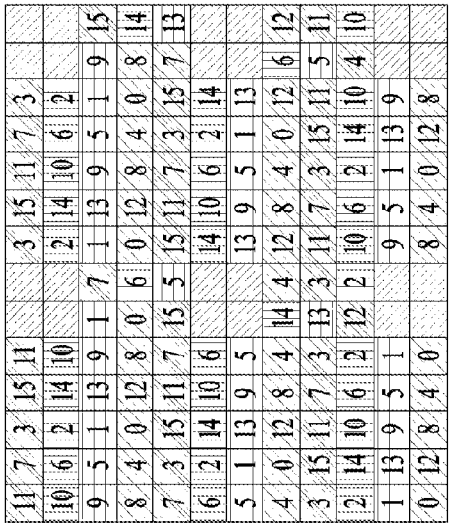
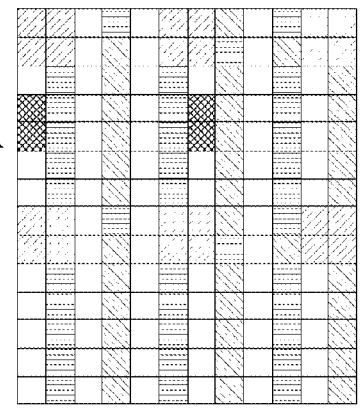
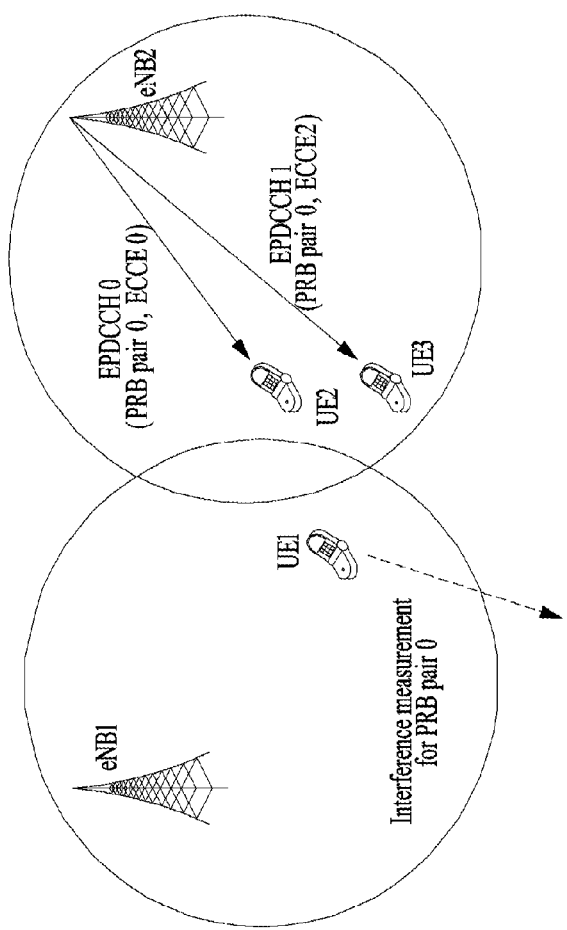
(a)
(b)
: DMRS
: REs impacted by EPDCCH 0
: REs impacted by EPDCCH 1
: REs used for interference measurement 1001
An example of proposed IMR configuration L-EPDCCH (4 ECCEs)
- : ECCE 1, 3
- : ECCE 0, 2
- : ECCE 1, 3
- : ECCE 0, 2
- : ECCE 1, 3
- : ECCE 0, 2
- : ECCE 0, 1, 2, 3
- : ECCE 0, 1, 2, 3
- : ECCE 0, 1, 2, 3
- : ECCE 0, 1, 2, 3

- : IMR configuration 0
- : IMR configuration 1

METHOD AND DEVICE FOR REPORTING CHANGE STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/002105, filed on Mar. 13, 2014, which claims the benefit of U.S. Provisional Application No. 61/780,863, filed on Mar. 13, 2013 and 61/805,132, filed on Mar. 25, 2013, the contents of which are all hereby incorporated by reference herein in their entirety.

TECHNICAL FIELD

Following description relates to a wireless communication system, and more particularly, to a method of measuring interference and a method of reporting channel state information based on the measured interference and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE OF THE INVENTION

Technical Task

A technical task of the present invention is to provide a method of precisely measuring interference in an inter-cell interference situation and a method of reporting channel state information.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of reporting channel state information (CSI), which is reported by a user equipment in a wireless communication system, includes the steps of deriving interference measurement based on a zero-power CSI-RS (CSI-reference signal) related to CSI-IM (CSI-interference measurement) resource configuration, calculating a CQI (channel quality information) value based on the interference measurement and transmitting CSI including the CQI value to an eNB. In this case, at least one or more REs according to the CSI-IM resource configuration can be included in ECCEs different from each other, which are included in a PRB pair.

To further achieve these and other advantages and in accordance with the purpose of the present invention, according to a second technical aspect of the present invention, a user equipment reporting channel state information (CSI) in a wireless communication system includes a reception module and a processor, the processor configured to derive interference measurement based on a zero-power CSI-RS (CSI-reference signal) related to CSI-IM (CSI-interference measurement) resource configuration, the processor configured to calculate a CQI (channel quality information) value based on the interference measurement, the processor configured to transmit CSI including the CQI value to an eNB. In this case, at least one or more REs according to the CSI-IM resource configuration can be included in ECCEs different from each other, which are included in a PRB pair.

The first technical aspect and the second technical aspect of the present invention can include followings.

If the REs according to the CSI-IM resource configuration are positioned at an OFDM symbol 5 and 6, the zero-power CSI-RS can consist of 4 REs.

If the REs according to the CSI-IM resource configuration are positioned at an OFDM symbol 9 and 10, the zero-power CSI-RS can consist of 8 REs.

The CSI-IM resource configuration can be UE-specifically indicated by a serving cell of the user equipment.

If the REs according to the CSI-IM resource configuration are positioned at an OFDM symbol 9 and 10, the zero-power CSI-RS can consist of 4 REs contiguous on a frequency axis.

The CSI-IM resource configuration can be applied to a subframe designated as an EPDCCH monitoring set designated by a neighbor cell of a serving cell of the user equipment.

The CSI-IM resource configuration can be applied to a PRB pair corresponding to a PRB pair designated as an EPDCCH PRB set designated by a neighbor cell of a serving cell of the user equipment.

The interference measurement can be respectively performed according to a DMRS port.

The CQI can be generated according to the ECCEs different from each other.

The CQI may correspond to a minimum aggregation level satisfying BLER of a control channel.

The user equipment can receive control information from a serving cell on an EPDCCH (enhanced physical downlink control channel).

The interference can include interference caused by EPDCCH transmitted by a neighbor cell of the serving cell.

Advantageous Effects

According to the present invention, it is able to improve incorrect interference measurement capable of being occurred when EPDCCH (enhanced physical downlink control channel) is transmitted in a neighboring cell.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for explaining a reference signal;

FIG. 6 is a diagram for explaining a channel state information reference signal;

FIG. 8 is a diagram for explaining EREG to ECCE mapping;

FIG. 9 is a diagram for explaining embodiment of the present invention;

BEST MODE

Mode for Invention

Figure 1:
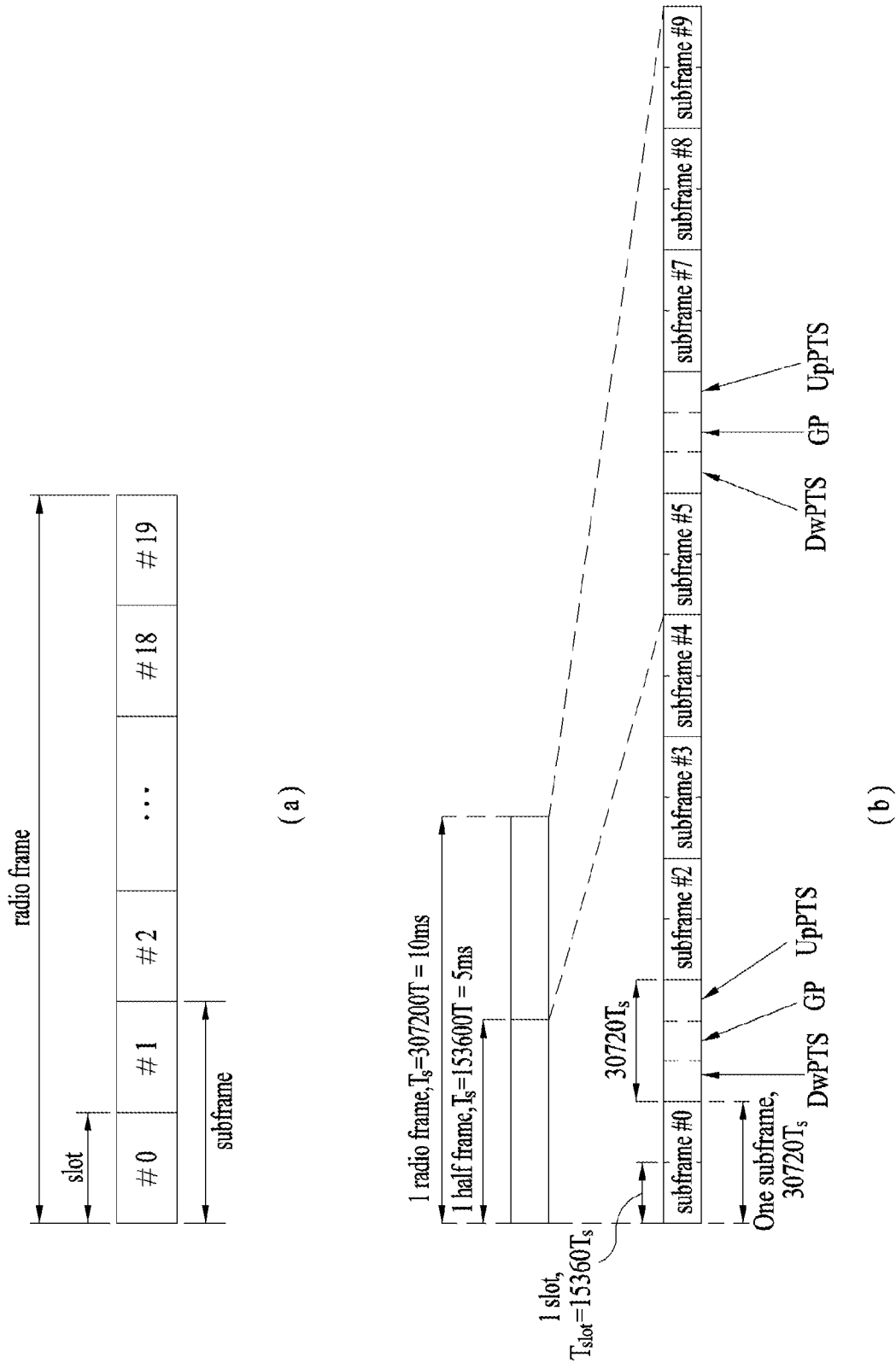
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
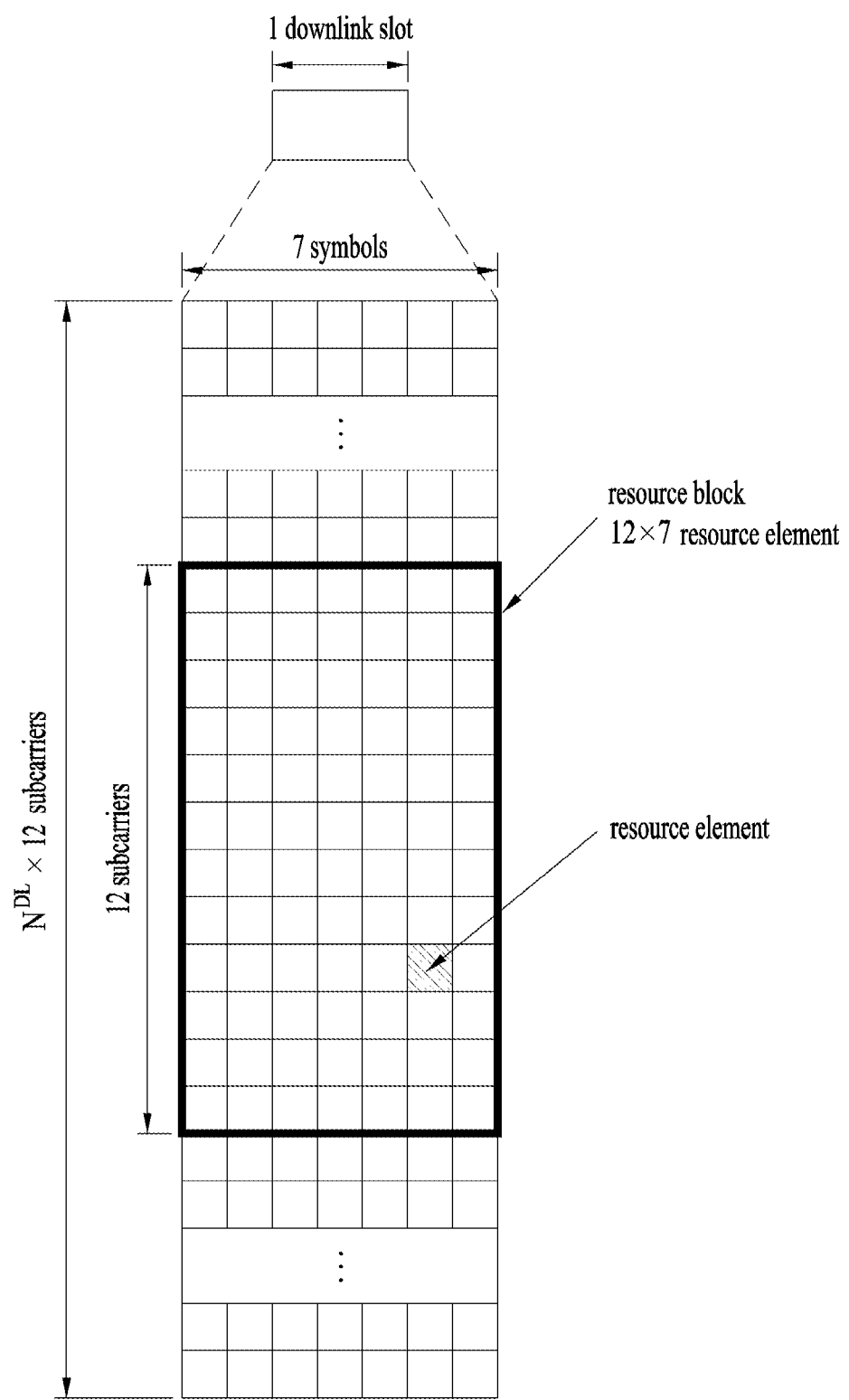
FIG. 2 is a diagram for a resource grid in downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
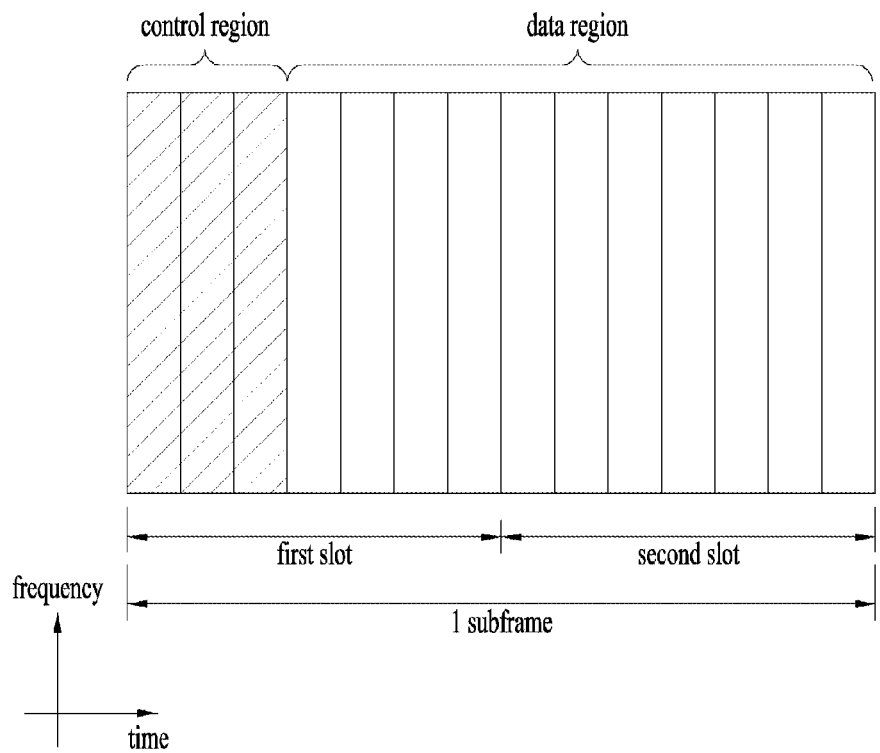
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
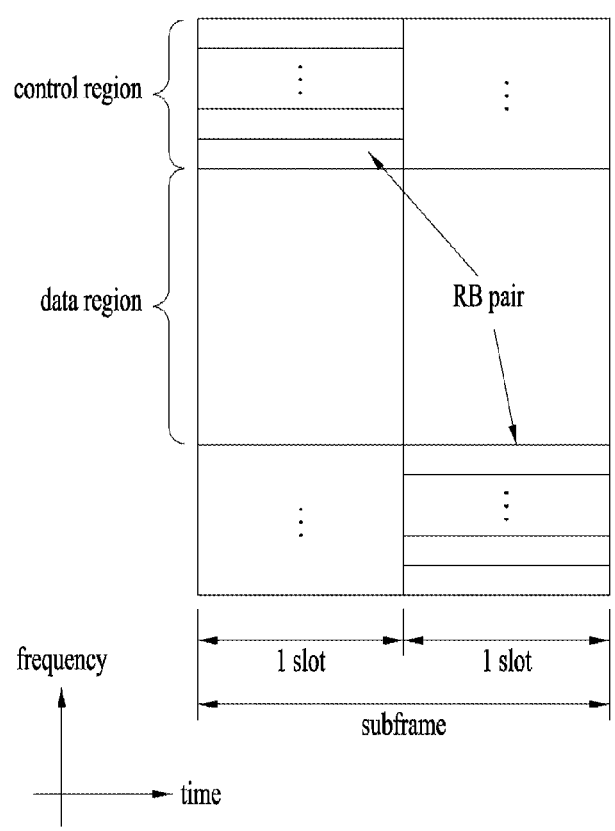
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:
  i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:
i) Cell-specific Reference Signal (CRS) shared among all UEs of a cell;
ii) UE-specific RS dedicated to a specific UE;
iii) DM-RS used for coherent demodulation of a PDSCH, when the PDSCH is transmitted;
iv) Channel State Information-Reference Signal (CSI-RS) carrying CSI, when downlink DM-RSs are transmitted;
v) Multimedia Broadcast Single Frequency Network (MBSFN) RS used for coherent demodulation of a signal transmitted in MBSFN mode; and
vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'ID' denotes the positions of DRSs.

CSI-RS

CSI-RS is an RS used for channel measurement in an LTE-A system supporting up to eight antenna ports on downlink. CSI-RS differs in this aspect from CRS used for both channel measurement and data demodulation and thus it is not necessary to transmit CSI-RSs in every subframe like CRSs. CSI-RS is used in Transmission Mode 9. For data demodulation, DM-RS is used.

More specifically, CSI-RSs may be transmitted through 1, 2, 4 or 8 antenna ports. Antenna port 15 may be used for one antenna port, antenna ports 15 and 16 for two antenna ports, antenna ports 15 to 18 for four antenna ports, and antenna ports 15 to 22 for eight antenna ports.

CSI-RSs may be generated by the following [Equation 1].

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1$$

[Equation 1]

Where $r_{l,n_s}(m)$ denotes the generated CSI-RSs, $c(i)$ denotes a pseudo-random sequence, $n_s$ is a slot number, $l$ is an OFDM symbol index, and $N_{RB}^{max,DL}$ denotes the maximum number of RBs in a downlink bandwidth.

The CSI-RSs generated by [Equation 1] may be mapped to REs on a per-antenna port basis by the following equation.

$$a_{k,l}^{(p)} = w_{l''} \cdot r_{l,n_s}(m')$$

[Equation 2]

$k = k' + 12m +$ $$\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' + \begin{cases} l'' & CSI \text{ reference signal configurations } 0 - 19, \\ & \text{normal cyclic prefix} \\ 2l'' & CSI \text{ reference signal configurations } 20 - 31, \\ & \text{normal cyclic prefix} \\ l'' & CSI \text{ reference signal configurations } 0 - 27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$l'' = 0, 1$ $m = 0, 1, \ldots, N_{RB}^{DL} - 1$ $$m' = m + \left\lfloor \frac{N_{RB}^{max,DL} - N_{RB}^{DL}}{2} \right\rfloor$$

In [Equation 2], k' and l' may be determined according to CSI-RS configurations as illustrated in [Table 1].

TABLE 1

| | | Number of CSI RSs configured | | | | | |
|---|---|---|---|---|---|---|---|
| CSI RS | | 1 or 2 | | 4 | | 8 | |
| Configuration | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |

TABLE 1-continued

| | | | Number of CSI RSs configured | | | |
|---|---|---|---|---|---|---|
| CSI RS | 1 or 2 | | 4 | | 8 | |
| Configuration | (k', l') | $n_s$ mod 2 | (k', l') | $n_s$ mod 2 | (k', l') | $n_s$ mod 2 |

| | | (k', l') | $n_s$ mod 2 | (k', l') | $n_s$ mod 2 | (k', l') | $n_s$ mod 2 |
|---|---|---|---|---|---|---|---|
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figure 6:
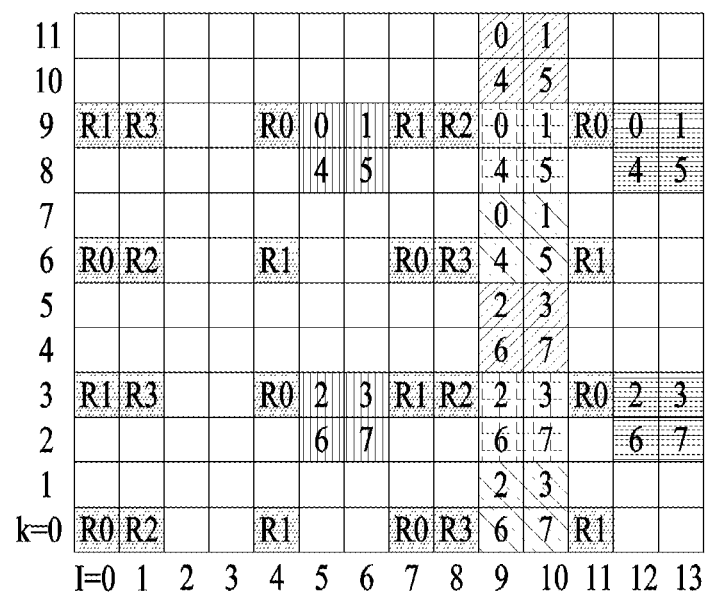

When a specific CSI-RS is configured by Equation 2 and Table 1, the specific CSI-RS may be mapped to REs on a per-antenna port basis. FIG. 6 shows that a CSI-RS is mapped to REs according to an antenna port in accordance with what is mentioned earlier. In FIG. 6, R0 to R3 indicates CRSs mapped to each antenna port and numbers indicate CSI-RS mapped to each antenna port. For instance, REs represented by numbers 0, 1 indicate that a CSI-RS corresponding to an antenna port 0 or 1 is mapped to the REs. In this case, a CSI-RS corresponding to two antenna ports is mapped to a same RE. The CSI-RS can be distinguished from each other by an orthogonal code different from each other.

Subsequently, as mentioned in the foregoing description, a CSI-RS can be transmitted in a specific subframe instead of every subframe. Specifically, a CSI-RS can be transmitted in a subframe satisfying Equation 3 in the following with reference to CSI-RS subframe configurations shown in Table 2 in the following.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

$$(10n_f + \lfloor n_s/2 \rfloor - \Delta_{CSI-RS}) \bmod T_{CSI-RS} = 0 \quad \text{[Equation 3]}$$

In Equation 3, $T_{CSI-RS}$, $\Delta_{CSI-RS}$, $n_f$ and $n_s$ indicate a period of transmitting a CSI-RS, an offset value, a system frame number and a slot number, respectively.

The aforementioned CSI-RS can be signaled to a user equipment as a CSI-RS configuration information element (CSI-RS-Config-r10).

TABLE 3

```
CSI-RS-Config-r10 ::=       SEQUENCE {
    csi-RS-r10                  CHOICE {
        release                     NULL,
        setup                       SEQUENCE {
            antennaPortsCount-r10       ENUMERATED {an1, an2, an4, an8},
            resourceConfig-r10          INTEGER (0..31),
            subframeConfig-r10          INTEGER (0..154),
            p-C-r10                     INTEGER (-8..15)
        }
    }
                                OPTIONAL,    -- Need ON
    zeroTxPowerCSI-RS-r10       CHOICE {
        release                     NULL,
```

TABLE 3-continued

```
        setup                           SEQUENCE {
           zeroTxPowerResourceConfigList-r10   BIT STRING (SIZE (16)),
           zeroTxPowerSubframeConfig-r10       INTEGER (0..154)
        }
    }
                                  OPTIONAL              -- Need ON
}
```

In Table 3, 'antennaPortsCount' indicates the number of antennas transmitting a CSI-RS (select one of 1, 2, 4, and 8). 'resourceConfig' indicates a position of an RE at which a CSI-RS is positioned in one RB in time-frequency resource. 'subframeConfig' indicates a subframe in which a CSI-RS is transmitted together with a CSI-RS EPRE value for PDSCH EPRE. In addition, an eNB also delivers information on a zero power CSI-RS.

In a CSI-RS configuration, 'resourceConfig' indicates a position at which a CSI-RS is transmitted. The 'resourceConfig' indicates a precise symbol position and a subcarrier position in one RB according to a CSI-RS configuration number, which is shown in Table 1, represented by numbers ranging from 0 to 31.

Channel State Information (CSI) Feedback

MIMO schemes may be classified into an open-loop MIMO scheme and a closed-loop MIMO scheme. In the open-loop MIMO scheme, a MIMO transmitter performs MIMO transmission without receiving CSI feedback from a MIMO receiver. In the closed-loop MIMO scheme, the MIMO transmitter receives CSI feedback from the MIMO receiver and then performs MIMO transmission. In the closed-loop MIMO scheme, each of the transmitter and the receiver may perform beamforming based on CSI to achieve a multiplexing gain of MIMO transmit antennas. To allow the receiver (e.g., a UE) to feed back CSI, the transmitter (e.g., an eNB) may allocate a UL control channel or a UL-SCH to the receiver.

The CSI feedback may include a rank indicator (RI), a precoding matrix index (PMI), and a channel quality indicator (CQI).

The RI is information about a channel rank. The channel rank indicates the maximum number of layers (or streams) that may carry different information in the same time-frequency resources. Since the rank is determined mainly according to long-term fading of a channel, the RI may be fed back in a longer period than the PMI and the CQI.

The PMI is information about a precoding matrix used for transmission of a transmitter and has a value reflecting the spatial characteristics of a channel. Precoding refers to mapping transmission layers to transmit antennas. A layer-antenna mapping relationship may be determined according to a precoding matrix. The PMI is the index of an eNB precoding matrix preferred by the UE based on a metric such as signal-to-interference-plus-noise ratio (SINR), etc. In order to reduce the feedback overhead of precoding information, the transmitter and the receiver may pre-share a codebook including multiple precoding matrices and only an index indicating a specific precoding matrix in the codebook may be fed back.

In a system supporting an extended antenna configuration (e.g. an LTE-A system), additional acquisition of multi-user (MU)-MIMO diversity using an MU-MIMO scheme is considered. In the MU-MIMO scheme, when an eNB performs downlink transmission using CSI fed back by one UE among multiple users, it is necessary to prevent interference with other UEs from occurring because there is an interference channel between UEs multiplexed in the antenna domain. Accordingly, CSI of higher accuracy than CSI in a single-user (SU)-MIMO scheme should be fed back in order to correctly perform MU-MIMO operation.

A new CSI feedback scheme may be adopted by modifying conventional CSI including an RI, a PMI, and a CQI so as to more accurately measure and report CSI. For example, precoding information fed back by the receiver may be indicated by a combination of two PMIs. One of the two PMIs (a first PMI) has a long-term and/or wideband property, and may be referred to as W1. The other PMI (a second PMI) has a short-term and/or subband property, and may be referred to as W2. A final PMI may be determined by a combination (or a function) of W1 and W2. For example, if the final PMI is denoted by W, W=W1*W2 or W=W2*W1.

The CQI is information indicating channel quality or channel strength. The CQI may be expressed as an index corresponding to a predetermined modulation and coding scheme (MCS) combination. That is, a CQI index that is fed back indicates a corresponding modulation scheme and code rate. In general, the CQI has a value reflecting a reception SINR that can be achieved when an eNB configures a spatial channel using a PMI.

The CSI feedback scheme is divided into periodic reporting over a physical uplink control channel (PUCCH) and aperiodic reporting over a PUSCH, which is an uplink data channel, according to a request from an eNB.

CSI Reference Resource

Current LTE/LTE-A defines a CSI reference resource related to channel measurement for the aforementioned CSI feedback/report. The CSI reference resource is defined by a physical RB group corresponding to a frequency band associated with CQI calculated in frequency domain. And, the CSI reference resource is defined by n-nCQI_ref in time domain. In this case, the n corresponds to a subframe in which CSI is transmitted or reported. The nCQI_ref corresponds to i) a smallest value among values equal to or greater than 4 for corresponding to a valid subframe in case of a periodic CSI report, ii) a valid subframe corresponding to a subframe in which a CSI request within an uplink DCI format is transmitted in case of an aperiodic CSI report, iii) 4, in case of a CSI request within a random access response grant in an aperiodic CSI report. In this case, the valid subframe indicates a subframe satisfying following conditions that the subframe corresponds to a downlink subframe for corresponding user equipment, the subframe is not a MBSFN subframe unless a transmission mode corresponds to a transmission mode 9, the subframe has DwPTS length equal to or greater than prescribed length in TDD, the subframe is not included in a measurement gap configured for corresponding user equipment, and if a user equipment is configured by a CSI subframe set in a periodic CSI report, the subframe corresponds to an element of the CSI subframe set. A CSI subframe set ($C_{CSI,0}$, $C_{CSI,1}$) can be set to corresponding user equipment by a higher layer. According to a current standard, a CSI reference resource can be included in one of two subframe sets ($C_{CSI,0}$, $C_{CSI,1}$). The CSI reference resource cannot be included in both sets.

Demodulation Reference Signal (DMRS)

A DMRS corresponds to a reference signal which is defined for a user equipment to estimate a channel for PDSCH. The DMRS can be used in transmission mode 7, 8 and 9. In an early stage, although the DMRS is defined for single layer transmission of an antenna port 5, the DMRS is extended for spatial multiplexing of maximum 8 layers. As a different name of the DMRS, i.e., a UE-specific reference signal, hints, the DMRS is transmitted for a specific single UE. Hence, the DMRS can be transmitted in an RB in which PDSCH for the specific UE is transmitted only.

Figure 7:
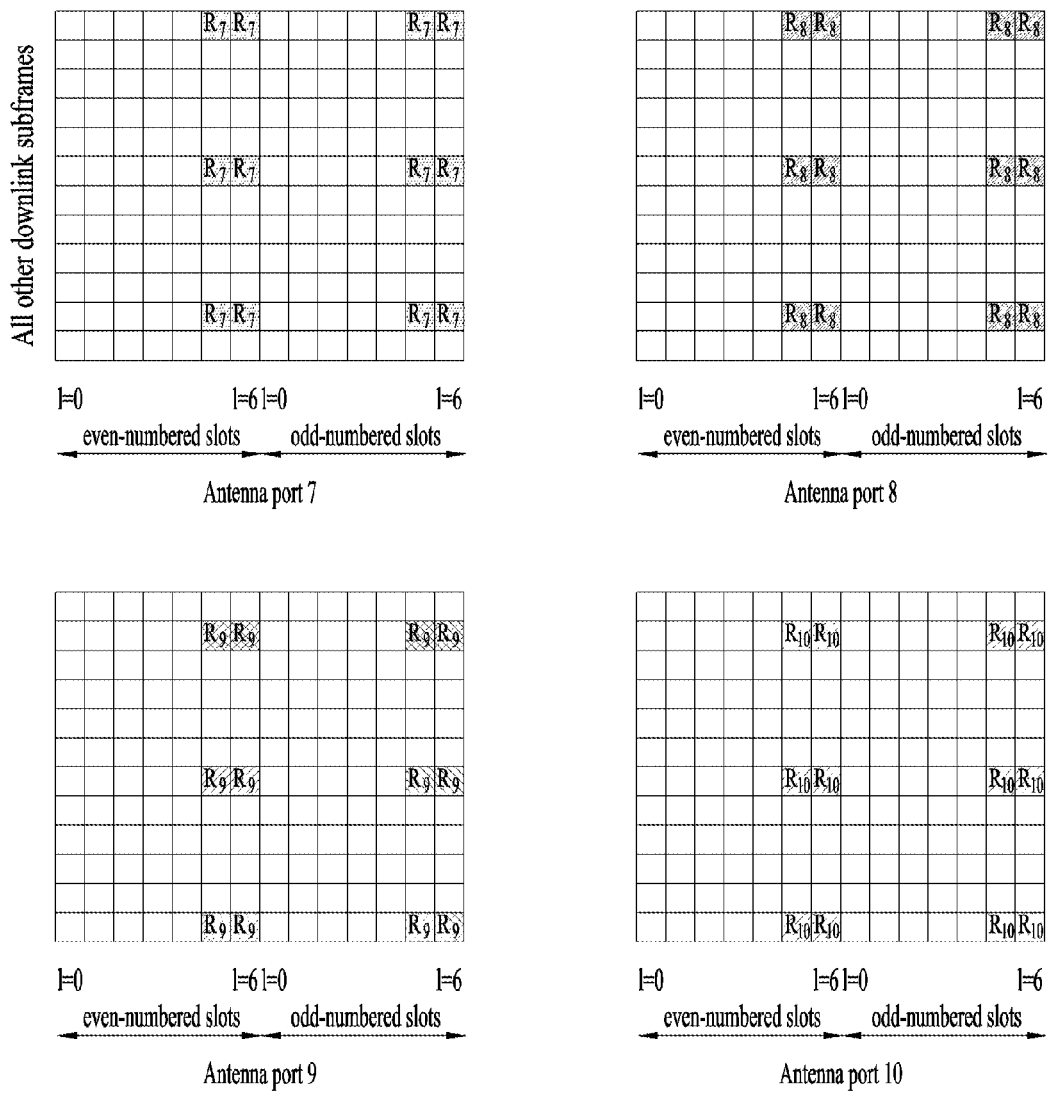
FIG. 7 is a diagram for explaining a demodulation reference signal.

Generation of a DMRS for maximum 8 layers is explained in the following. A DMRS can be transmitted in a manner that a reference-signal sequence (r(m)) generated according to Equation 4 in the following is mapped to a complex-valued modulation symbols ($a_{k,l}^{(p)}$) according to Equation 5 in the following. FIG. 7 shows a DMRS mapped to a resource grid of a subframe according to Equation 5 in case of a normal CP. FIG. 7 shows antenna port 7 to antenna port 10.

$$r(m) = \quad \text{[Equation 4]}$$
$$\frac{1}{\sqrt{2}}(1-2\cdot c(2m)) + j\frac{1}{\sqrt{2}}(1-2\cdot c(2m+1)),$$
$$m = \begin{cases} 0, 1, \ldots, 12N_{RB}^{max,DL}-1 & \text{normal } CP \\ 0, 1, \ldots, 16N_{RB}^{max,DL}-1 & \text{extended } CP \end{cases}$$

In this case, r(m), c(i), $N_{RB}^{max,DL}$ correspond to a reference signal sequence, a pseudo-random sequence and the maximum RB numbers of a downlink bandwidth, respectively.

$$a_{k,l}^{(p)} = w_p(i) \cdot r(3 \cdot l^* \cdot N_{RB}^{max,DL} + 3 \cdot n_{PRB} + m') \quad \text{[Equation 5]}$$

$$w_p(i) = \begin{cases} \overline{w}_p(i) & (m'+n_{PRB})\bmod 2 = 0 \\ \overline{w}_p(3-i) & (m'-n_{PRB})\bmod 2 = 1 \end{cases}$$

$$k = 5m' + N_\omega^{RB} n_{PRB} + k'$$

$$k' = \begin{cases} 1 & p_7 - \{7, 8, 11, 13\} \\ 0 & p_8 - \{9, 10, 12, 14\} \end{cases}$$

$$l = \begin{cases} l'\bmod 2 + 2 & \text{if in a special subframe with configuration 3, 4, 8 or 9} \\ l'\bmod 2 + 2 + 3\lfloor l'/2 \rfloor & \text{if in a special subframe with configuration 1, 2, 6 or 7} \\ l'\bmod 2 + 5 & \text{if not in a special subframe} \end{cases}$$

$$l' = \begin{cases} 0, 1, 2, 3 & \text{if } n_a \bmod 2 = 0 \text{ and in a special subframe with configuration 1, 2, 6, or 7} \\ 0, 1 & \text{if } n_b \bmod 2 = 0 \text{ and not in special subframe with configuration 1, 2, 6, or 7} \\ 2, 3 & \text{if } n_c \bmod 2 = 0 \text{ and in a special subframe with configuration 1, 2, 6, or 7} \end{cases}$$

$$m' = 0, 1, 2$$

As shown in Equation 5, when a reference signal sequence is mapped to a complex-valued modulation symbol, an orthogonal sequence $\overline{w}_p(i)$ shown in Table 3 in the following is applied according to an antenna port.

TABLE 4

| Antenna port $p$ | [$\overline{w}_p(0)$ $\overline{w}_p(1)$ $\overline{w}_p(2)$ $\overline{w}_p(3)$] |
|---|---|
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Enhanced-PDCCH (EPDCCH)

In LTE system appearing after release 11, in order to solve a PDCCH capacity deficiency problem caused by CoMP (coordinate multi point), MU-MIMO (multi user-multiple input multiple output) and the like and a PDCCH performance degradation problem due to inter-cell interference, it is considering the use of enhanced-PDCCH (EPDCCH) capable of being transmitted via a legacy PDSCH region. And, unlike a legacy CRS-based PDCCH, the EPDCCH can perform channel estimation based on a DMRS to obtain a pre-coding gain and the like.

EPDCCH transmission can be divided into localized EPDCCH transmission and distributed EPDCCH transmission according to a configuration of PRB (physical resource block) pair used for transmitting EPDCCH. The localized EPDCCH transmission indicates a case that ECCE for transmitting single DCI is adjacent to each other in frequency domain and a specific precoding can be applied to obtain beamforming gain. For instance, the localized EPDCCH transmission can be performed based on contiguous ECCEs of a number corresponding to an aggregation level. On the contrary, the distributed EPDCH transmission may indicate a case that a single EPDCCH is transmitted in PRB pair separated from each other in frequency domain and can obtain a gain in terms of frequency diversity. For instance, the distributed EPDCCH transmission can be performed based on ECCE consisting of 4 EREGs, which are respectively included in a PRB pair separated from each other in frequency domain. One or two EPDCCH (PRB) sets can be configured to a terminal via upper layer signaling and the like and each of the EPDCCH sets can be used for either the localized EPDCCH transmission or the distributed EPDCCH transmission. If there exist two EPDCCH PRB sets, a part of the two EPDCCH PRB sets or all of the two EPDCCH PRB sets can be overlapped with each other.

A base station can transmit control information in one or more EPDCCH PRB sets in a manner of mapping the control information to REs of EREG allocated for EPDCCH. In this case, the EREG is used to define mapping of a control channel which is mapped to an RE. 16 EREGs (EREG number 0 to 15) may exist in a single PRB pair. One ECCE can include 4 EREGs (or 8 EREGs) and one EPDCCH can include x number of ECCEs (x correspond one of 1, 2, 4, 8, 16 and 32). In case of the distributed EPDCCH transmission, EREGs existing in a plurality of PRB pairs can configure a single ECCE. More specifically, in case of the distributed EPDCCH transmission, EREG-to-ECCE mapping (hereinafter, first ECCE number—EREG number—PRB number relation) may indicate that an ECCE index in an EPDCCH PRB set corresponds to an EREG index $$\left\lfloor \frac{n_{ECCE}}{N_P} \right\rfloor + i * N_{CP}$$

in a PRB pair index $$\left( n_{ECCE} \left| i * \max\left(1, \left\lfloor \frac{N_P}{N} \right\rfloor \right) \right. \right) \bmod N_P.$$

In this case, the N indicates the number of EREGs per ECCE, $N_{CP}$ indicates the number of ECCEs per PRB pair, $N_{P,set1}$ indicates the number of PRB pairs of the first EPDCCH PRB set, $N_{P,set2}$ indicates the number of PRB pairs of a second EPDCCH PRB pair and i indicates 0, 1, ..., N−1. For instance, if 4 PRB pairs are included in an EPDCCH PRB set, according to the aforementioned first ECCE number-EREG number-PRB number relation, an ECCE index 0 includes an EREG 0 of a PRB pair 0, an EREG 4 of a PRB pair 1, an EREG 8 of a PRB pair 2, and an EREG 12 of a PRB pair 4. This sort of EREG-to-ECCE mapping relation is shown in FIG. 7.

In order for a user equipment to receive/obtain control information (DCI) via EPDCCH, similar to a legacy LTE/LTE-A system, the terminal is able to perform blind decoding. More specifically, the terminal can attempt (monitoring) to decode EPDCCH candidate set according to an aggregation level for DCI formats corresponding to a configured transmission mode. In this case, the EPDCCH candidate set becoming a target of the monitoring can be called an EPDCCH UE-specific search space and the search space can be configured according to an aggregation level. And, somewhat different from the aforementioned legacy LTE/LTE-A, the aggregation level may become {1, 2, 4, 8, 16 and 32} according to a subframe type, a CP length, an amount of available resource amount in a PRB pair and the like.

In case of a user equipment to which EPDCCH is configured, REs included in PRB pairs are indexed by an EREG and the EREG can be indexed again in an ECCE unit. An EPDCCH candidate configuring a search space is determined and blind decoding is performed based on the indexed ECCE. By doing so, it may be able to receive control information.

Having received EPDCCH, a user equipment can transmit a reception confirmation response (ACK/NACK) on PUCCH in response to the EPDCCH. In this case, similar to the aforementioned Equation 1, a resource being used, i.e., an index of a PUCCH resource can be determined by a lowest ECCE index among ECCEs used for transmitting the EPDCCH. In particular, it may be able to be represented as Equation 1 in the following.

$$n_{PUCCH\text{-}ECCE}^{(1)} = n_{ECCE} + N_{PUCCH}^{(1)} \quad \text{[Equation 6]}$$

In Equation 6, $n_{PUCCH\text{-}ECCE}^{(1)}$ the PUCCH resource index, $n_{ECCE}$ indicates the lowest ECCE index among ECCEs used for transmitting the EPDCCH and $N_{PUCCH}^{(1)}$ (also represented as $N_{PUCCH,EPDCCH}^{(1)}$) indicates a value delivered via upper layer signaling and indicate a point where the PUCCH resource index starts.

Yet, if PUCCH resource indexes are uniformly determined by the aforementioned Equation 6, a resource collision problem may occur. For instance, in case of configuring two EPDCCH PRB sets, since ECCE indexing is independently performed in each EPDCCH PRB set, a lowest ECCE index in each EPDCCH PRB set may be identical to each other. In this case, if a start point of a PUCCH resource is differentiated according to a user, a problem may be solved. Yet, if the start point of the PUCCH resource is differentiated according to all users, since it may indicate to reserve a huge amount of PUCCH resources, it is inefficient. And, similar to MU-MIMO, since DCI of many users can be transmitted at a same ECCE position in EPDCCH, it is necessary to have a method of allocating PUCCH resource in consideration of the aforementioned cases. In order to solve the aforementioned problem, ARO (HARQ-ACK resource offset) is introduced. The ARO shifts a lowest ECCE index among ECCE indexes configuring EPDCCH and a PUCCH resource determined by a start offset of a PUCCH resource delivered via upper layer signaling to avoid collision of PUCCH resources. The ARO is indicated by 2 bits of DCI format 1A/1B/1D/1/2A/2/2B/2C/2D transmitted on EPDCCH as shown in Table 5 in the following.

TABLE 5

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

A base station selects a value from ARO values shown in Table 5 for a specific user equipment and may be then able to inform the specific user equipment of the ARO for determining a PUCCH resource via a DCI format. The user equipment detects an ARO field in a DCI format of the user equipment and may be able to transmit a reception confirmation response via a PUCCH resource determined using a value of the ARQ field.

Meanwhile, if transmission of control information transmitted on EPDCCH is performed by both a serving cell and a neighbor cell, it may be difficult to precisely measure interference. Incorrect interference measurement is directly connected to inaccurate CSI reporting and may cause such a problem as resource waste (actual interference level is low but strong interference is measured), control information delivery failure (actual interference level is high but weak interference is measured) and the like. This sort of situation is shown in FIG. 9. Referring to FIG. 9, a user equipment (UE 1) measures interference for PRB pair 0. In this case, assume that a neighbor cell (eNB 2) of a serving cell (eNB 1) of the user equipment transmits control information to a UE 2 and a UE 3 via EPDCCH 0 (ECCE 0) and EPDCCH 1 (ECCE 2), respectively, in a same resource (i.e., time/frequency resource identical to the PRB pair 0 of the eNB 1 cell). (And, assume that the neighbor cell does not use a resource of the ECCE 1 and a resource of ECCE 3.) And, assume that both the serving cell (eNB 1) and the neighbor cell (eNB 2) include EREG index shown in FIG. 9 (*b*). And, assume that a zero-power CSI-RS corresponding to an RE of cross stripes is set to the user equipment (UE 1) by CSI-IM (CSI-interference measurement) resource configuration. Although the user equipment (UE 1) derives interference measurement to be performed in the zero-power CSI-RS, since it is not overlapped with EPDCCH 0, 1 transmitted by the neighbor cell (eNB 2) in the zero-power CSI-RS, it may be recognized as there is little interference. In this case, the user equipment (UE 1) recognizes it as there is no/less interference interfered by the neighbor cell (eNB 2) in the PRB pair 0 and may perform a wrong operation reporting CQI of a high level. If the zero-power CSI-RS consists of REs of a region overlapped with EPDCCH 0 and/or EPD- CCH 1 only, the user equipment (UE 1) recognizes it as there exists strong interference over the whole of the PRB pair and reports CQI of a low level. Consequently, it may cause resource waste. In particular, in case of EPDCCH, interference may occur in ECCE unit. Hence, embodiment of the present invention enabling a user to more precisely measure interference in the aforementioned situation is explained in the following description.

Embodiment 1

A user equipment derives interference measurement based on a zero-power CSI-RS related to CSI-IM resource configuration, calculates a CQI value based on the interference measurement and may be able to periodically/aperiodically transmit CSI including the CQI to a base station. In this case, it is able to make at least one or more REs according to the CSI-IM resource configuration to be included in ECCEs different from each other included in a PRB pair. In other word, REs constructing an IMR (interference measurement resource) are extracted from each ECCE and interference of all ECCEs can be averaged. To this end, i) (a combination of) a legacy CSI-IM resource configuration is used (to make at least one or more REs according to the CSI-IM resource configuration to be included in ECCEs different from each other included in a PRB pair), ii) REs constructing a specific IMR are signaled by a base station via upper layer signaling or iii) a new CSI-IM resource pattern is defined to enable that at least one or more REs according to the CSI-IM resource configuration are included in ECCEs different from each other included in a PRB pair.

Figure 10:
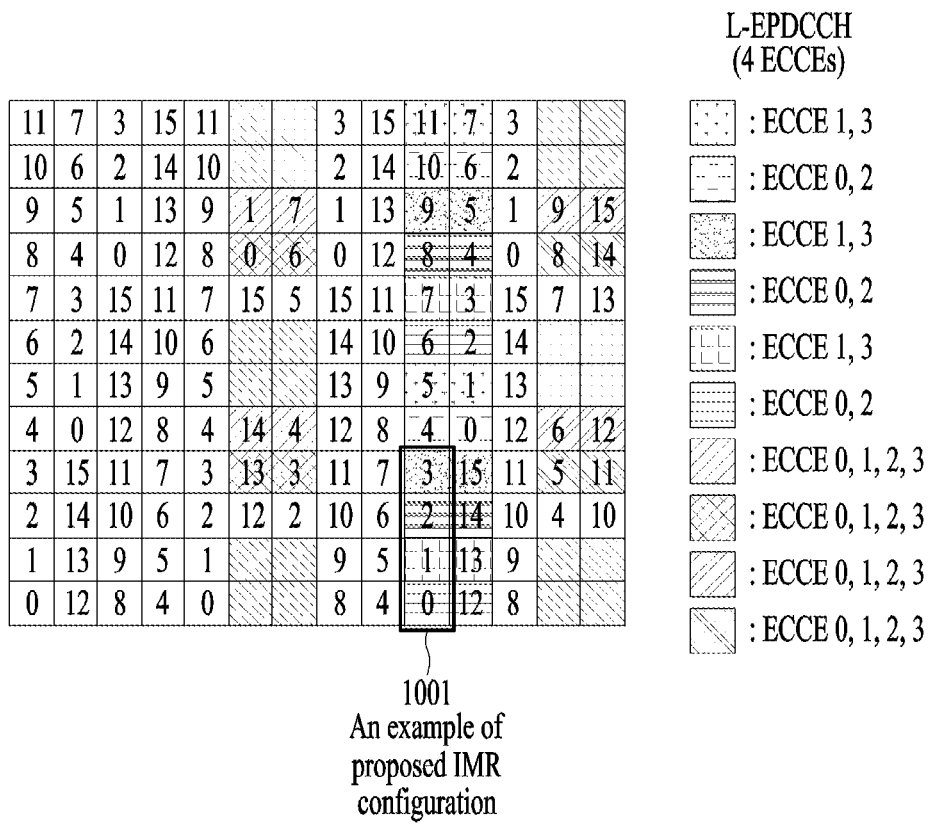
FIGS. 10 and 11 are diagrams for explaining a method of measuring interference according to embodiment of the present invention.

A case of the above-mentioned i) is explained with reference to FIG. 10 in the following. If REs according to CSI-IM resource configuration are positioned at OFDM symbol 5 and 6 (and/or OFDM symbol 12 and 13 (assume that an OFDM symbol index starts from 0)), the zero-power CSI-RS can consist of 4 REs. In particular, although it follows CSI-IM resource configuration defined by a legacy LTE-system, 4 REs are overlapped with positions of ECCE 0, 1, 2 and 3, respectively. This can be interpreted as CSI-RS configuration existing on specific symbols (5 and 6 OFDM symbol or 12 and 13 OFDM symbol) is used as CSI-IM only when a CSI-IM is defined using 4 REs only such as legacy CSI-IM configuration. If REs according to CSI-IM resource configuration are positioned on OFDM symbol 9 and 10, the zero-power CSI-RS can consist of 8 REs. In this case, the 8 REs may correspond to a legacy 8 ports CSI-RS resource configuration or a combination of two legacy 4 ports CSI-RS resource configurations. In case of the 4 ports CSI-RS resource configuration, it is necessary to satisfy a condition that at least one or more REs according to CSI-IM resource configuration are included in ECCEs different from each other included in a PRB pair.

A case of the above-mentioned ii) means that CSI-IM resource configuration is UE-specifically (or cell-specifically) indicated by a serving cell of the user equipment. In other word, as shown in a lined part 1001 of FIG. 10, a base station selects REs in a manner that at least one or more REs are included in ECCEs different from each other included in a PRB pair and may be able to inform a user equipment of the selected REs. In particular, FIG. 10 can be comprehended as, if REs according to CSI-IM resource configuration are position on OFDM symbol 9 and 10, the zero-power CSI-RS consists of 4 contiguous REs on a frequency axis. Subsequently, as shown in the lined part 1001 of FIG. 10, a case of the above-mentioned iii) means that a new pattern is configured to enable at least one or more REs according to the CSI-IM resource configuration to be included in ECCEs different from each other included in a PRB pair.

If REs constructing an IMR are signaled by a base station/serving cell, it is not mandatory for the at least one or more REs to be include in each of all ECCEs. In other word, if at least one or more neighbor cells are included in ECCE, which is used for transmitting EPDCCH, it may be sufficient. Yet, in this case, it is necessary for a user equipment to recognize that interference definitely exists in the IMR.

Meanwhile, the proposed CSI-IM resource configuration can be (limitedly) applied to a subframe designated as an EPDCCH monitoring set by a neighbor cell of a serving cell of the user equipment. Or, the CSI-IM resource configuration can be (limitedly) applied to a PRB pair corresponding to a PRB pair designated as an EPDCCH PRB set by the neighbor cell of the serving cell of the user equipment. This indicates to have IMR configurations different from each other in time/frequency domain according to a subframe (set)/PRB pair (set). Or, a base station, which has recognized EPDCCH set of a neighbor cell, can enable a PRB pair corresponding to the EPDCCH set of the neighbor cell (or EPDCCH monitoring subframe set of the neighbor cell) to use 8 ports IMR configuration via cooperation/coordination between base stations.

In case of a distributed EPDCCH, since EREG constructing a single ECCE can be positioned at PRB pairs different from each other, if the present invention is applied to the distributed EPDCCH, each PRB pair of the distributed EPDCCH set may have IMR configurations different from each other (e.g., EREG index at which IMR is positioned can be differently configured according to a PRB pair). For instance, if a single distributed EPDCCH is transmitted to 4 PRB pairs in a manner of being divided in EREG unit (if PRB pairs constructing a distributed EPDCCH set correspond to a PRB pair 0, 1, 2 and 3), an IMR can be configured in a manner of extracting an RE from EREG 0, 1, 2 and 3, respectively, in the PRB pair 0, an IMR can be configured in a manner of extracting an RE from EREG 4, 5, 6 and 7, respectively, in the PRB pair 1, an IMR can be configured in a manner of extracting an RE from EREG 8, 9, 10 and 11, respectively, in the PRB pair 2 and an IMR can be configured in a manner of extracting an RE from EREG 12, 13, 14 and 15, respectively, in the PRB pair 3. This can be interpreted as an eNB can measure interference caused by a distributed EPDCCH in a manner of configuring the aforementioned IMR for PRB pairs corresponding to PRB pairs configured as a distributed EPDCCH set by a neighbor cell.

A user equipment measures interference in the aforementioned IMR, measures a signal/channel via a non-zero power CSI-RS and may be able to calculate CQI based on the measured interference and the signal/channel. Subsequently, the user equipment can report CSI including at least one selected from the group consisting of CQI, RI and PMI to a serving cell. In this case, the CQI according to embodiment of the present invention can be defined by a minimum aggregation level satisfying BLER (e.g., 1% BLER) of a control channel. In this case, a payload size to which a BLER requirement is applied can be determined in advance and a length of an information bit of a specific DCI format can be used as a reference for the payload size. A user equipment to which CSI for EPDCCH is set can report a minimum aggregation level satisfying an EPDCCH demodulation requirement to an eNB in each resource region (e.g., EPDCCH set, PRB pair, ECCE etc.). The minimum aggregation level can be reported by 2 bits. If a modulation scheme of a control channel is extended up to 16QAM, 64QAM and the like, it may be necessary to use 12 bits (QPSK, 16QAM, 64QAM and aggregation level 1, 2, 4 and 8) to report the minimum aggregation level. And, the CSI for the EPDCCH omits RI, selects the PMI from a rank 1 precoding matrix and selects the minimum aggregation level for the CQI.

In the foregoing description, a region for measuring the CSI for the EPDCCH can be restricted to an EPDCCH set. In particular, a user equipment can measure interference of PRB pairs belonging to an EPDCCH set of a serving cell only. An eNB may ask a user equipment to measure interference of all EPDCCH sets or a specific EPDCCH set.

CSI measurement for EPDCCH can be classified into a wideband CSI and a subband CSI. More specifically, the wideband CSI may indicate to measure and report average CSI for EPDCCH set. In case of the wideband CSI, it may have measurement configurations different from each other according to each resource region (e.g., PRB pair set in EPDCCH set, PRB pair and the like). And, an eNB can configure and signal a measurement configuration according to interference characteristic (according to each PRB pair) (e.g., PDSCH/EPDCCH) using EPDCCH-related information (e.g., EPDCCH set configuration) of a neighbor cell delivered from the neighbor cell via cooperation with the neighbor cell. For instance, interference of PDSCH can be measured using a legacy IMR and the like and interference of EPDCCH can be measured in a manner of newly configuring the proposed new IMR.

The subband CSI may indicate to measure CSI for a resource unit (e.g., PRB pair, ECCE, EREG etc.) smaller than an EPDCCH set. In this case, a concrete resource unit for measurement can be indicated via RRC signaling, physical layer signaling and the like or can be configured in advance. If CSI is measured in a PRB pair unit, an IMR can be configured by a combination of REs shown in FIG. 10. If CSI is measured in an ECCE unit, an IMR can be configured by a set of REs constructing an identical ECCE (to obtain precoding information and the like appropriate for each ECCE). In this case, the IMR can be configured using an IMR pattern defined in advance or a (configurable) IMR pattern signaled by an eNB.

If the aforementioned interference measurement is performed by a user equipment belonging to a serving cell in each case of Table 6 in the following, interference of a neighbor cell can be more precisely measured. In Table 6, PDSCH may indicate that a transmission unit of a specific signal is greater than a PRB pair. And, EPDCCH may indicate that a transmission unit of a specific signal is smaller than a PRB pair.

TABLE 6

|  | Serving cell | Neighbor cell |
| --- | --- | --- |
| Case 1 | PDSCH | PDSCH |
| Case 2 | PDSCH | EPDCCH |
| Case 3 | EPDCCH | PDSCH |
| Case 4 | EPDCCH | EPDCCH |

Yet, in case of the Case 4 in Table 6, in particular, if EPDCCH of a neighbor cell becomes interference and EPDCCH is received from a serving cell, interference measurement measured in a PRB pair unit may be inefficient. Hence, interference measurement in an ECCE unit is explained in the following description.

Embodiment 2

When a serving cell transmits EPDCCH and a resource corresponding to the EPDCCH is interfered by EPDCCH of a neighbor cell (or inter-layer), it may be able to perform segmented interference measurement in an ECCE unit. To this end, an eNB can inform a UE of a type of a resource (unit) to be used for interference measurement for a specific resource region (e.g., subframe set and/or PRB pair (set)) via upper layer signaling and the like. (Of course, the type can be determined in advance.) Information, which is signaled to the UE by the eNB, includes i) a type of interference measurement resource, ii) a resource region to which the signaling of the eNB is applied, iii) measurement granularity (e.g., PRB pair, ECCE, PRB pair set, etc.), iv) time section to which the signaling of the eNB is applied (e.g., duration that interference characteristic of a neighbor cell is identically maintained) and the like. Specifically, the eNB can signal a CRS (port), a DMRS (port), a CSI-RS, IMR configuration (including combination of CSI-RS (IMR) configuration), a resource among random REs signaled by the eNB to the user equipment to measure interference of a specific resource region. In this case, 2, 4, 8 ports CSI RS configuration and the like can be included. (The IMR configuration can also reuse the 2, 4 and 8 ports CSI-RS. IMR configuration included in a single ECCE only, IMR configuration including all ECCE components and the like can be newly defined). The eNB can provide information on the resource region to which the signaling of the eNB is applied. A resource region to which the signaling is applied can be signaled together according to each interference measurement resource. Specifically, a region to which interference measurement is applied can be signaled by combination of a specific subframe set, a specific PRB pair set, a specific ECCE etc. And, for instance, it is able to restrict a specific interference measurement resource to be applied to a specific EPDCCH set only. Or, interference measurement resources different from each other can be applied to each of PRB pairs in the specific EPDCCH set, respectively. (More specifically, interference measurement can be performed in an ECCE unit (or in a CDM group unit of a DMRS port).)

If there is a section where EPDCCH set of a neighbor cell and EPDCCH set of the eNB are overlapped with each other, the eNB can signal the UE to measure interference of the overlapped section according to each DMRS port (or DMRS CDM group). The UE measures interference according to each DMRS port and may be able to perform CSI report based on the measured interference. This can be comprehended as the UE performs the CSI report according to each ECCE (or CDM group).

Figure 11:
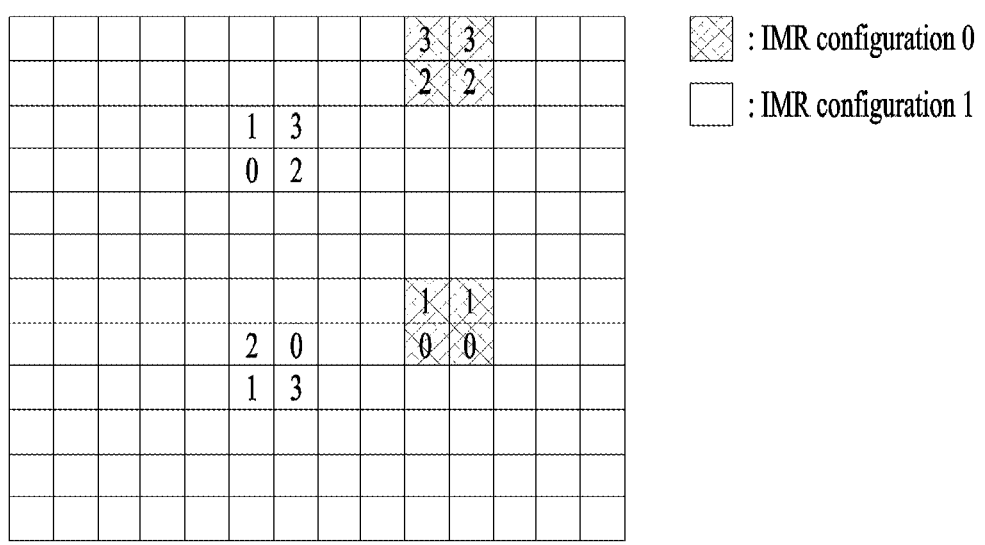

Meanwhile, in case of performing interference measurement according to each DMRS port, it may be unable to distinguish a port of an aggregation level 1 from a port of a higher aggregation level. In order to solve the aforementioned problem, the eNB configures 4 IMRs in a specific region (e.g., PRB pair) and may be able to make 4 interference measurements different from each other to be performed. In this case, each IMR can consist of REs constructing a specific ECCE only and corresponding information can be reported to the eNB. Having received the information, the eNB can perform EPDCCH transmission using an ECCE of less interference. In this case, the UE measures interference in a partial PRB pair among the total system bandwidths using a CRS or a legacy IMR configuration and measures interference in a specific PRB pair (e.g., a PRB pair belonging to EPDCCH set of a neighbor cell) signaled by the eNB using a new IMR configuration in ECCE unit. Or, 8-ports IMR configuration is signaled and interference measurement of an ECCE level can be indicated. FIG. 11 shows an example of the 8-ports IMR configuration. Numbers show in FIG. 11 indicate ECCE index. The UE measures interference in each IMR configuration in a manner of binding REs corresponding to an identical ECCE index with each other and may be able to consider the measured interference as interference of the ECCE.

In the aforementioned embodiments, an eNB can use both PDSCH CSI and EPDCCH CSI to transmit EPDCCH. For instance, an EPDCCH set is configured based on the PDSCH CSI and a PRB pair actually transmitting the EPDCCH in the EPDCCH set can be determined based on the EPDCCH CSI.

Although the aforementioned description is explained with examples of a normal CP and a normal subframe, the description can also be applied to an extended CP, a special subframe and the like. For instance, in case of configuring a partial special subframe of a normal CP or an extended CP, one ECCE can consist of 8 EREGs and it indicates that one PRB pair can consists of 2 ECCEs. In this case, an IMR consisting of 4 REs can be configured in a manner of extracting 2 REs from each ECCE. And, the proposed IMR configuration can be configured by a form of CSI-RS configuration (i.e., define a new CSI-RS pattern) or can be indicated to a UE by a rate matching pattern (i.e., a random RE is configured as an IMR irrespective of CSI-RS configuration and it is able to inform the UE that data is not mapped to the random RE).

Device Configuration According to Embodiment of the Present Invention

Figure 12:
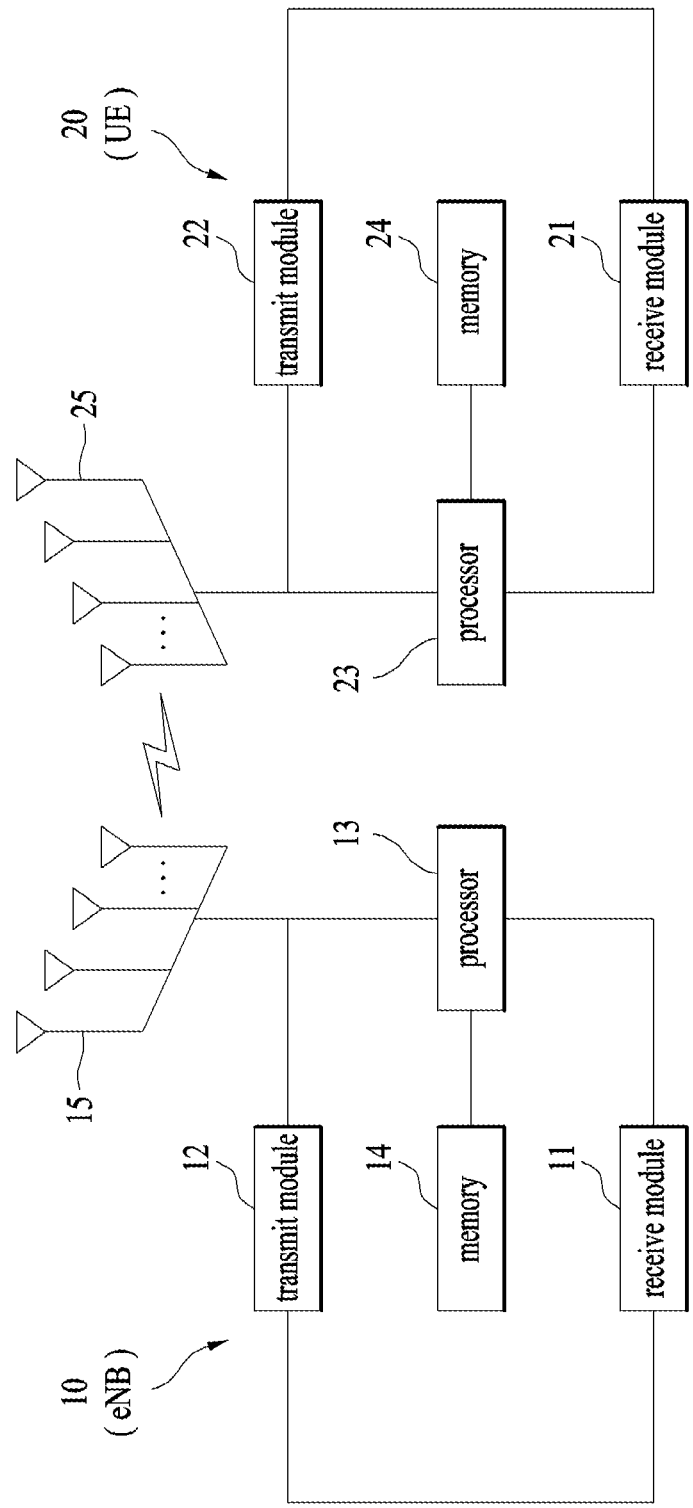
FIG. 12 is a diagram for configuration of a transceiver.

FIG. 12 is a diagram for configuration of a transmit point apparatus and a user equipment according to embodiment of the present invention.

Referring to FIG. 12, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 12, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 12 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of reporting CSI (channel state information) by a user equipment (UE) in a wireless communication system, the method comprising:
   performing an interference measurement based on a zero-power CSI-RS (CSI-reference signal) related to a CSI-IM (CSI-interference measurement) resource configuration;
   calculating a CQ (channel quality information) value based on the interference measurement; and
   transmitting the CSI containing the CQ value to an eNB (evolved Node B),
   wherein the CSI-IM resource configuration includes at least one RE (Resource Element) for each of a plurality of ECCEs (enhanced control channel elements) contained in each of a plurality of PRB (Physical Resource Block) pairs,
   wherein performing the interference measurement comprises using interferences of all ECCEs measured based on the corresponding at least one RE; and
   wherein performing the interference measurement further comprises averaging the interferences of each of the ECCEs.

2. The method of claim 1, wherein:
   the zero-power CSI-RS comprises 8 REs if the REs are positioned at OFDM (Orthogonal Frequency-Division Multiplexing) symbol 9 and 10; and
   the zero-power CSI-RS comprises 4 REs if the REs are positioned at OFDM symbol 5 and 6.

3. The method of claim 1, wherein the CSI-IM resource configuration is UE-specifically indicated by a serving cell of the UE.

4. The method of claim 3, wherein the zero-power CSI-RS comprises 4 REs contiguous on a frequency axis if the REs are positioned at OFDM (Orthogonal Frequency-Division Multiplexing) symbol 9 and 10.

5. The method of claim 1, wherein the CSI-IM resource configuration is applied to a subframe designated as an EPDCCH (Enhanced-Physical Downlink Control CHannel) monitoring set designated by a neighbor cell of a serving cell of the UE.

6. The method of claim 1, wherein the CSI-IM resource configuration is applied to a PRB pair designated as an EPDCCH (Enhanced-Physical Downlink Control CHannel) PRB set by a neighbor cell of a serving cell of the UE.

7. The method of claim 1, wherein the interference measurement is performed according to a DMRS (Demodulation reference signal) port.

8. The method of claim 1, wherein the CQI is calculated according to ECCEs different from each other.

9. The method of claim 1, wherein the CQI corresponds to a minimum aggregation level satisfying BLER of a control channel.

10. The method of claim 1, further comprising receiving control information from a serving cell on an EPDCCH (Enhanced-Physical Downlink Control CHannel).

11. The method of claim 10, wherein the interference comprises interference caused by an EPDCCH transmitted by a neighbor cell of the serving cell.

12. A user equipment (UE) reporting channel state information (CSI) in a wireless communication system, the UE comprising:
   a reception module configured to receive signals;
   a transmission module configured to transmit signals; and
   a processor configured to perform an interference measurement based on a zero-power CSI-RS (CSI-reference signal) related to a CSI-IM (CSI-interference measurement) resource configuration, to calculate a CQ (channel quality information) value based on the interference measurement and to control the transmission module to transmit the CSI containing the CQ value to an eNB (evolved Node B),
   wherein the CSI-IM resource configuration includes at least one RE (Resource Element) for each of a plurality of ECCEs (enhanced control channel elements) contained in each of a plurality of FRB (Physical Resource Block) pairs,
   wherein performing the interference measurement comprises using interferences of all ECCEs measured based on the corresponding at least one RE, and
   wherein performing the interference measurement further comprises averaging the interferences of each of the ECCEs.

13. The UE of claim 12, wherein:
   the zero-power CSI-RS comprises 4 REs if the REs are positioned at OFDM (Orthogonal Frequency-Division Multiplexing) symbol 5 and 6; and
   the zero-power CSI-RS comprises 8 REs if the REs are positioned at OFDM symbol 9 and 10.

14. The UE of claim 12, wherein the CSI-IM resource configuration is applied to a subframe designated as an EPDCCH (Enhanced-Physical Downlink Control CHannel) monitoring set designated by a neighbor cell of a serving cell of the UE.

15. The UE of claim 12, wherein the CSI-IM resource configuration is applied to a PRB pair designated as an EPDCCH (Enhanced-Physical Downlink Control CHannel) PRB set by a neighbor cell of a serving cell of the UE.

16. The UE of claim 12, wherein the interference measurement is performed according to a (DMRS Demodulation reference signal) port.

17. The UE of claim 12, wherein the CQI is calculated according to ECCEs different from each other.

18. The UE of claim 12, wherein the CQI corresponds to a minimum aggregation level satisfying BLER of a control channel.

19. The UE of claim 12, wherein the processor is further configured to control the reception module to receive control information from a serving cell on an EPDCCH (Enhanced Physical Downlink Control CHannel).

* * * * *